H. B. HARTMAN.
ELECTRODE BOX FOR LIQUID PURIFYING APPARATUS.
APPLICATION FILED MAY 22, 1909.
951,314. Patented Mar. 8, 1910.
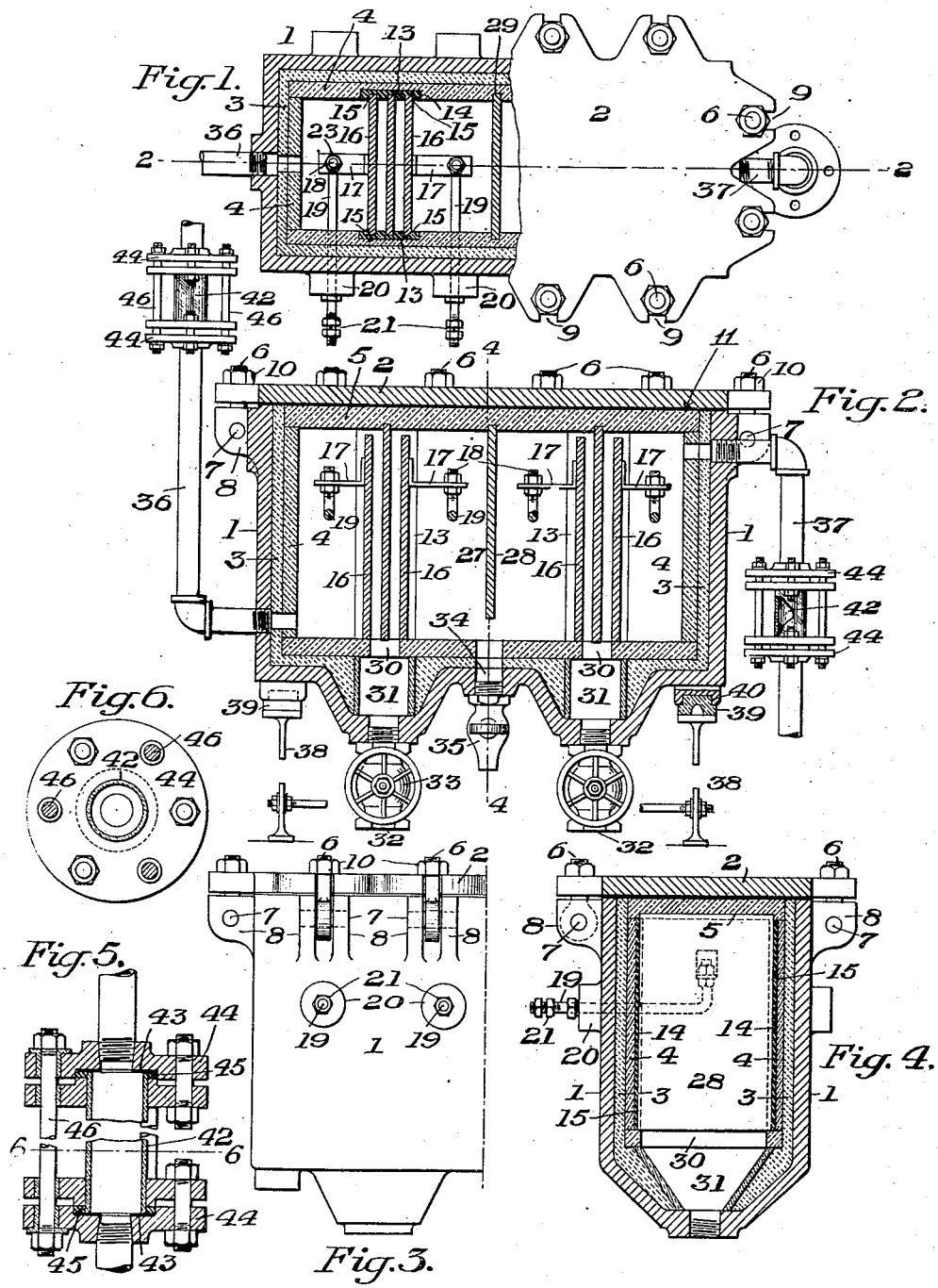

UNITED STATES PATENT OFFICE.

HARRY B. HARTMAN, OF PITTSBURG, PENNSYLVANIA, ASSIGNOR TO McDOWELL MANUFACTURING COMPANY, OF PITTSBURG, PENNSYLVANIA, A CORPORATION OF PENNSYLVANIA.

ELECTRODE-BOX FOR LIQUID-PURIFYING APPARATUS.

951,314.   Specification of Letters Patent.   Patented Mar. 8, 1910.

Application filed May 22, 1909. Serial No. 497,732.

*To all whom it may concern:*

Be it known that I, HARRY B. HARTMAN, resident of Pittsburg, in the county of Allegheny and State of Pennsylvania, have invented a new and useful Improvement in Electrode-Boxes for Liquid-Purifying Apparatus, of which the following is a specification.

This invention relates to electrolytic liquid purifying apparatus, and more particularly to the construction of an electrode box wherein the liquid is treated by an electric current.

The object of the invention is to provide an electrode box for the purpose specified which is of simple and durable construction, in which the electrodes or plates can be readily cleaned, which is so insulated as to prevent leakage of current as far as possible, and which is so constructed as to permit ready variation of the distances between the electrode plates to meet various conditions and qualities of liquid, and which also provides a coagulation and reaction space intermediate the electrodes.

The invention comprises the construction and arrangement of parts hereinafter described and claimed.

In the accompanying drawing Figure 1 is in part a top plan view and in part a horizontal section through the electrode box; Fig. 2 is a vertical central longitudinal section through the box on the line 2—2, Fig. 1; Fig. 3 is a side elevation of a portion of the box; Fig. 4 is a cross-section on the line 4—4, Fig. 2; Fig. 5 is a longitudinal section through one of the insulating pipe sections; and Fig. 6 is a cross section on the line 6—6, Fig. 5.

The box comprises the main body portion 1 consisting of ends, sides and bottom, and a cover 2. These parts are preferably constructed of metal and joined by any suitable means so that the box can be hermetically sealed.

Inside of the body 1 is a layer of suitable plastic insulating material 3, such as cement, but preferably asphaltum, and inside of this is an insulating lining 4 formed either of glass, porcelain, slate or the like, being shown as composed of slate and comprising end, side and bottom portions. The cover 2 is likewise lined on its inner surface with a plate or slab 5 of glass, porcelain, slate or other suitable insulating material. The means shown for connecting the cover to the box comprises a plurality of bolts 6 pivoted at 7 between ears 8 on the sides and ends of the body of the box, and adapted to swing up through slots 9 formed in the edges of the cover, and being provided at their upper ends with nuts 10. This provides for securely holding the cover on the box and one which will permit the ready removal of the cover and in which the fastening means cannot be accidentally dropped or become lost. Any other fastening means, however, would answer the purpose. A gasket 11 of rubber or other suitable yielding material will be placed between the cover and the body in order to provide a liquid and gas tight seal.

The inner face of the side walls of the lining 4 of the box are provided with oppositely disposed recesses 13 running from top to bottom and in these are seated grooved plates or strips 14. These plates or strips are provided with the grooves 15 for receiving the electrode plates 16. The drawings show each strip 15 provided with three grooves for receiving three electrode plates, but obviously the number can be varied as desired. The strips 14 can be made of hard rubber, fiber, wood, or other suitable material and are readily removable endwise in order to permit the same to be replaced by strips having grooves differently spaced so as to vary the distances between the electrode plates as is necessary when treating different characters of liquid. For instance, water containing a large percentage of acid or mineral matter necessitates the plates being placed farther apart on account of the greater conductivity of the water, while with water which contains little conducting impurities the plates must be placed closer together. By providing the boxes with recessed walls containing the removable grooved plates I provide for the ready change of the box to meet these varied conditions.

The electrode plates 16 are preferably formed of aluminum, or of an alloy containing aluminum. The two outside or end plates of the group are connected to the electrical terminals and in order to permit the ready removal of the plates without disturbing the terminals the following construction is used: Connected to each of the plates is a metal clip 17, preferably of aluminum, projecting horizontally away from the electrode plate and provided with a vertical opening receiving the upturned end 18 of a rod 19 extending through a suitable insulated stuffing box 20 in a side wall of the box, and provided on its outer end with binding post or nuts 21 to which the electric conductor is attached. Nuts 23 are threaded on the upturned end 18 of the rod 19 and clamp the clip 17 therebetween so as to give a good electrical connection. One of the rods 19 of the group of plates is connected to one side of the supply circuit while the other rod is connected to the opposite side of the supply circuit. Any current can be used, either an alternate current or a direct current in which latter case suitable means will be provided for reversing the current at stated intervals, as more fully described in my application filed March 3, 1908, Serial No. 418,745.

The three plates of each group are so arranged as shown in Fig. 2, that the liquid flows in over the top of one of the outside plates, thence down between the same and the middle plate, underneath the latter and up between the latter and the other outside plate, and then over the top of the latter. The upper end of the middle plate is shown seated in a groove in the lining 5 of the cover so that liquid cannot pass over the same, and the outside plates fit closely against the bottom of the box for a similar purpose. Instead of having the plates stop short of the top and bottom to permit the water to pass over or under the same as shown, these plates might extend fully from top to bottom and be provided with openings at their top and bottom ends respectively through which the liquid passes.

The box is provided with a plurality of groups or sets of electrode plates in order to subject the liquid to several treatments by the electric current during its passage through the box, the box shown in the drawing having two such groups, but obviously any greater or lesser number may be used. The plates of the several groups are identical and identically arranged, but may of course be varied as desired or necessary. Between the several groups of electrode plates is a large chamber 27 which serves as a coagulation and reaction chamber. Its cross-sectional area is many times larger than the space between the electrode plates so that the liquid in said chamber 27 flows only very slowly, or is fairly quiescent, thus holding the liquid for a considerable period of time and permitting the oxygen or ozone and the salts generated by the electric current to react on the impurities in the liquid and to coagulate the same. To prevent the liquid settling in a pocket in the bottom of said mixing chamber and also to assist in mixing the liquid, I provide a baffle plate 28 substantially at the center of the chamber 27 and extending down from the top but not quite to the bottom of the box, and which compels the liquid coming from the first set of electrode plates to flow downwardly and pass underneath said baffle plate and thence upwardly on the opposite side before entering the second group of electrode plates. Any desired number of baffle plates may be employed. This plate 28 is slidably mounted in grooves 29 in the side walls of the box, so that it can be readily removed when the cover of the box is taken off.

To permit the ready cleaning of the plates and box, the bottom of the lining of the box underneath each group of electrode plates is provided with an opening 30 which communicates with an open box 31 set in the asphaltum in the box and extending down into a tapering or downwardly sloping projecting portion or hopper 31 on the bottom of the box, the latter being provided with a flush outlet 32 controlled by a suitable cut-off valve 33. In cleaning, the cover is removed and the middle plates pulled out, which permits the insertion of a suitable cleaning brush or the like between the two outside electrode plates, to brush off the deposit on the latter. With a reversed current, as described in my application aforesaid, the deposits on the plates slough off from time to time so that little cleaning is necessary, and even when necessary can be quickly effected, as the deposit on the plates is very soft. The deposits drop down into the projections or hoppers 31 and can be blown out from time to time by merely opening the valves 33. A flushing opening 34 controlled by a blow off cock 35, is also provided through the bottom at about the middle of the mixing chamber 27.

The inlet or supply is through a pipe 36 entering through one end of the box and the outlet is through the service pipe 37 extending through the opposite end of the box near the top so that the box is always maintained full of liquid and the plates are kept covered.

In order to thoroughly insulate the box and prevent leakage of electric current as far as possible, said box is supported upon a suitable insulating base, shown as a stand 38 upon which rest bodies or buttons 39 of glass, porcelain or other suitable insulating material, and projecting up into sockets 40 in the bottom of the box. This thoroughly insulates the metal box from the stand 38. The supply and service pipes or flanges 44 secured to the pipe sections, shown as consisting of sections of glass tubing 42 seating in depressions 43 in disks or flanges 44 secured to the pipe sections, suitable packing 45 being provided to make a liquid tight joint. Bolts 46 extend through openings in the disks or flanges 44 and are suitably insulated therefrom, as shown, and serve to clamp the glass pipe sections 42 between said flanges. This breaks the continuity of the metallic supply and service pipes so that there can be no leakage of electric current except the small amount which is conducted through the liquid.

The box described is of simple and durable construction, is absolutely sealed so as to retain all the gases generated by the electric current and give the same opportunity to act on the organic matter in the liquid, provides for several treatments of the liquid by means of the electric current, with an intermediate coagulation and reaction on the same, can be readily cleaned, can be easily varied to get the proper space between the plates for the treatment of different characters of liquids, and is so thoroughly insulated that leakage and wastage of the electric current is practically entirely overcome.

The box can be built of any desired size and any desired number of groups of electrode plates may be provided therein.

The box is adapted for any character of current, but preferably an alternating or a periodically reversed direct current. The terminals are connected merely to the outside plates of each group, the middle or intermediate plate becoming a bi-polar plate. Any number of such intermediate plates may be used in any one group, but in all cases there will preferably be an odd number of plates, in order that the water may leave as well as enter at the upper end of the plates.

If desired all the plates may be connected in the circuit, but the arrangement shown in the drawings is preferred as it permits the ready removal of the intermediate plate or plates for cleaning, and also the easy removal of the outside plates by merely taking off the top nuts 23, after which said plates can be slipped endwise out of the box.

What I claim is:

1. Electrolytic liquid purifying apparatus comprising a box, a plurality of removable vertical electrode plates therein arranged to intercept the passage through the box and cause all the liquid to flow therebetween in zigzag course up and down, a removable cover sealing said box and holding the plates in position, a flushing outlet underneath said plates, and electrical connections to said plates.

2. Electrolytic liquid purifying apparatus comprising a box, a plurality of sets of removable vertical electrode plates therein arranged to intercept the passage through the box and cause all the liquid to flow therebetween in zigzag course up and down, said sets of plates being arranged with an intervening coagulating and reaction space of much greater cross-sectional area than the passage between said plates, a removable cover sealing said box and holding the plates in position, and electrical connections to said plates.

3. Electrolytic liquid purifying apparatus comprising a box, a plurality of sets of removable vertical electrodes therein arranged to intercept the passage through the box and cause all the liquid to flow therebetween in zigzag course up and down, said sets of plates being arranged with an intervening coagulating and reaction space of much greater cross-sectional area than the passage between said plates, a flushing outlet beneath each set of plates, a removable cover sealing said box and holding the plates in position, and electrical connections to said plates.

4. Electrolytic liquid purifying apparatus comprising a sealed electrode box, a plurality of sets of electrode plates therein arranged to cause all the liquid to flow therebetween, said sets of plates being arranged with an intervening reaction space of greater cross-sectional area than the passages between said plates, and a baffle in said reaction space.

5. Electrolytic liquid purifying apparatus comprising an electrode box, a plurality of sets of electrode plates therein with an intervening reaction space, each set comprising a plurality of odd number of plates with the inlet and outlet at the tops of the outside plates and the intermediate plate arranged to give a zigzag up and down course to the liquid.

6. Electrolytic liquid purifying apparatus comprising an electrode box, a plurality of sets of electrode plates therein with an intervening reaction space, each set of plates comprising a plurality of odd number of plates with the inlet and outlet at the tops of the outside plates and the intermediate plate arranged to give a zigzag up and down flow, and a baffle plate in the reaction space projecting from the top of the box downwardly and having a water passage at its lower edge.

7. Electrolytic liquid purifying apparatus comprising an electrode box, a set of electrode plates therein comprising outside plates and an intermediate plate supported solely in vertical guides and removable endwise and upwardly, and a flushing outlet through the bottom of the box below said plates.

8. Electrolytic liquid purifying apparatus comprising an electrode box, a group of vertical electrode plates therein comprising outside plates and an intermediate plate, the intermediate plate being supported solely in vertical guides and removable vertically, and electric connections to the outside plates, said connections being separable vertically.

9. Electrolytic liquid purifying apparatus comprising an electrode box, interchangeable grooved strips secured in the side walls of said box in a manner to permit their ready removal, and electrode plates slidably held in the grooves of said strips.

10. Electrolytic liquid purifying apparatus comprising an electrode box, vertically arranged interchangeable grooved strips secured in the side walls of said box in a manner to permit their ready removal, electrode plates slidably fitting in the grooves of said plates, and electric terminals connected to the outside plates by means of connections separable vertically.

11. Electrolytic liquid purifying apparatus comprising an electrode box having recessed side walls, interchangeable grooved strips removably seated in said walls, and electrode plates slidably held in the grooves of said strips.

12. Electrolytic liquid purifying apparatus comprising an electrode box provided with vertical recesses in its side walls, interchangeable grooved strips in said recesses, and electrode plates slidably held in the grooves of said strips.

In testimony whereof, I have hereunto set my hand.

HARRY B. HARTMAN.

Witnesses:
 HOWARD NEELY,
 F. W. WINTER.